2 Sheets—Sheet 1.

G. D. HAWORTH.

CORN-PLANTER.

Reissued July 18, 1876.

No. 7,234.

Witnesses:
Alex Mahon
John E. Genter

Inventor:
George D. Haworth
by A. M. Smith Atty

H. PETERS, PHOTO-LITHOGRAPHER, WASHINGTON, D. C.

2 Sheets—Sheet 2.
G. D. HAWORTH.
CORN-PLANTER.
No. 7,234. Reissued July 18, 1876.
Fig. 3.
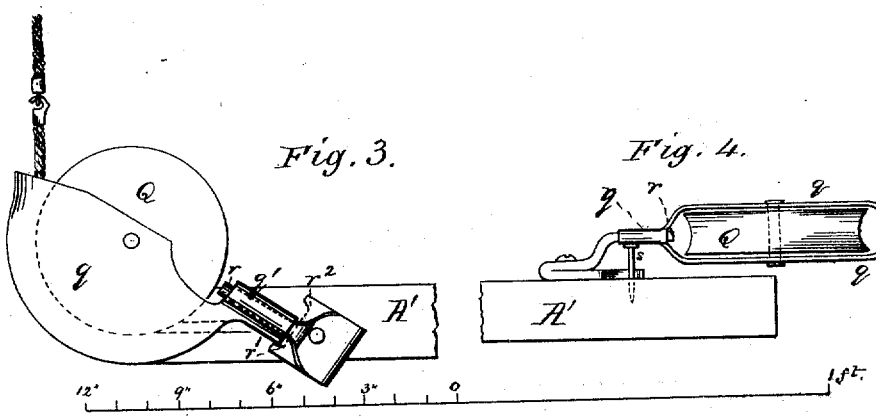
Fig. 4.
Fig. 5.
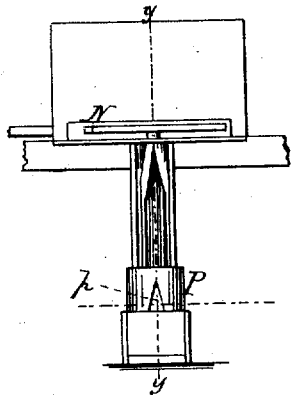
Fig. 6.
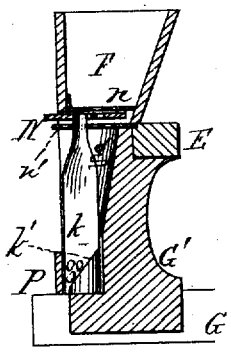
Fig. 7.
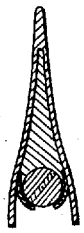
Witnesses.
Alex Mahon
John G. Center.
Inventor:
George D. Haworth
by A. L. Smith, atty.
N. PETERS, PHOTO-LITHOGRAPHER, WASHINGTON, D. C.

UNITED STATES PATENT OFFICE

GEORGE D. HAWORTH, OF DECATUR, ILLINOIS.

IMPROVEMENT IN CORN-PLANTERS.

Specification forming part of Letters Patent No. 134,747, dated January 14, 1873; reissue No. 7,234, dated July 18, 1876; application filed June 27, 1876.

DIVISION A.

*To all whom it may concern:*

Be it known that I, GEORGE D. HAWORTH, of Decatur, county of Macon, and State of Illinois, have invented certain new and useful Improvements in Corn-Planters, of which the following is a full, clear, and exact description, reference being had to the accompanying drawings, making part of this specification, in which—

Figure 1:
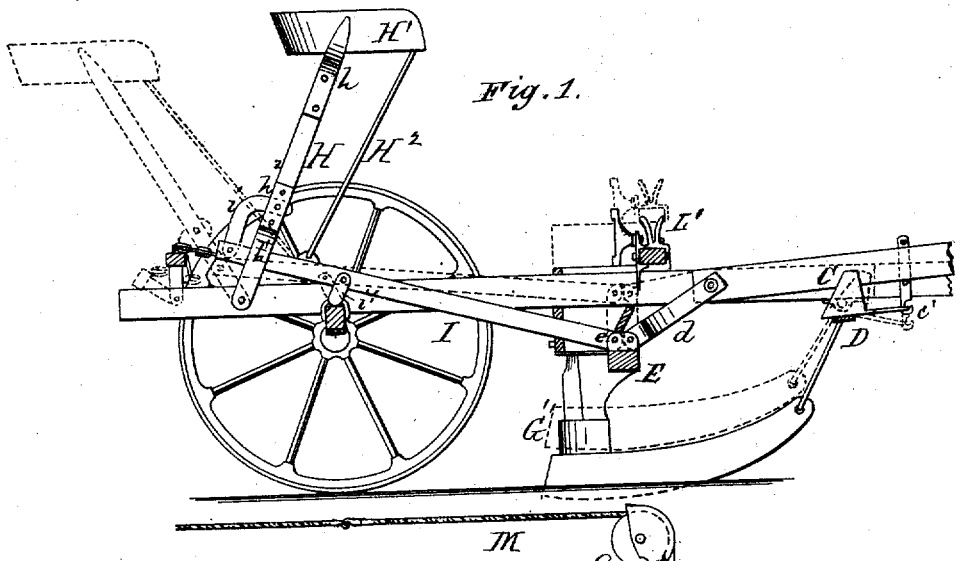
Figure 2:
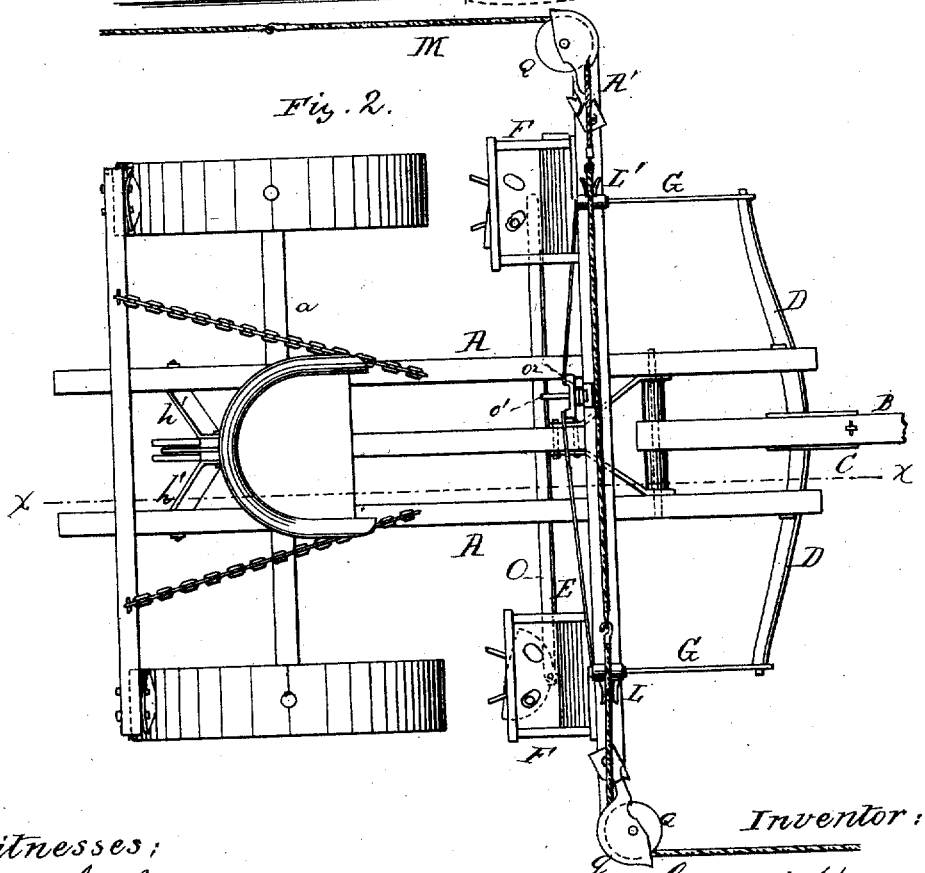

Figure 1 represents a vertical longitudinal section through my improved machine, taken on the line *x x*, Fig. 2; and Fig. 2 is a plan view of the same. Fig. 3 is a plan view of the pulley-holder and pulley, and Fig. 4 is a side elevation of the same. Fig. 5 is a rear view of the seed-depositing devices. Fig. 6 is a vertical section through said devices on the line *y y*, Fig. 5; and Fig. 7 is a transverse section taken on the line *z z*.

Similar letters of reference denote corresponding parts wherever used.

My invention consists, first, in a novel arrangement of parts, adapting the seeding attachment to always maintain a horizontal position, notwithstanding the irregularities in the surface of the ground over which the machine is drawn; second, in an arrangement of vibrating seat-standard and connecting rod or lever, in combination with the seeding devices, for raising and holding the latter up above the ground, or for depressing them into working position; third, in novel devices for facilitating the passage of the corn to and the scattering of the same upon the ground; fourth, in combining the devices of both the upper and lower seed-drops with the actuating-cord, in such manner as to cause the latter to impart a positive movement in both directions to said dropping devices; and, fifth, in a novel construction of pulley-holder, whereby it is adapted to revolve back and forth through half a circle, obviating the necessity of removing the check-row cord in turning the machine, said pulley-holder being an improvement on that embraced in Letters Patent granted to me February 22, 1870, No. 100,032.

In the accompanying drawings, A A represent two longitudinal frame-bars mounted upon and secured to the main drive-wheel axle *a*, and supporting the seeding parts of the machine. B is the pole or tongue, pivoted at its rear end on a rod passing through the bars A A. In advance of the pivot of the tongue is a shoe or socket-plate, C, provided with vertical flanges, which embrace the tongue between them, while allowing free vertical and longitudinal play of the tongue and shoe relative to each other. The forward end of this shoe is suspended from the tongue by a vibrating link, *c'*, and to its lower face is secured a bent transverse bar, D, which is pivoted in suitable bearings on the lower faces of the bars A A. The outer ends of this bar D curve downward and to the rear, and have the forward ends of the furrow-shares G G pivoted thereon, as shown. The forked rear ends of these furrow-shares have grooved seeding tubes or standards G' G' secured to them, which, at their upper ends, are connected by a transverse bar, E, at or near midway of the length of which is secured a flanged bracket, *e*, to the vertical flanges of which the rear lower ends of links or straps *d d* are pivoted, the forward ends of said links being pivoted to the transverse rod forming the tongue-pivot.

The seeding-hoppers F and the seed-discharging devices are connected with the bar E, and the latter being connected with the frame-bars A by means of pivoted bent bar D and link *d*, which act like the links of a parallel rule, the horizontal position of the seeding attachment will be preserved in rising and falling to conform to the uneven surface of the ground over which the machine is drawn.

H is a seat-standard, forked or provided at its ends with angular straps, those at the upper end *h* clasping and being pivoted to the seat $H^1$, and those at the lower end $h^1$ $h^1$ being pivoted to the bars A A, as shown. The standard H is slotted at $h^2$ to receive one end of a bent bar, *i*, and is provided with a series of transverse perforations, in any one of which said bar *i* may be pivoted for adjusting its throw, as desired. The lower end of the bent link or bar *i* is pivoted to the rear end of a bar or lever, I, the forward end of which is pivoted in the bracket *e* on the bar E. The bar or lever I has its fulcrum in a vibrating shoe *i'* on the main axle *a*. As the seat-standard is vibrated backward it acts through the link $i$ and lever I to raise the furrow-shares G out of the ground, and, when thrown sufficiently back, to place the pivotal connection of the link $i$, with the standard H, in rear of the pivotal connection of said link with bar or lever I, a lock is formed, holding the furrow-shares above the ground for transportation.

When the standard is thrown forward into the position shown in full lines, the weight of the driver is utilized for forcing the furrow-shares into the ground, the position of the driver regulating the depth of the furrow. $H^2$ is a link connecting the forward edge of seat $H^1$ with the lever I, in advance of the seat-standard, and serving in connection therewith as a parallel link, for preserving the horizontal position of the seat when the standard H is vibrated. $k$ is a vertical rock-shaft, arranged within the groove or concavity $g$ of the standard G′, and stepped in a shoulder or projection at the lower end of said standard, as shown. The shaft $k$ is made tapering toward its upper end, which is secured in a vibrating or rocking seed-slide, N, to which motion is imparted by a reciprocating bar, O. The slide is located between perforated plates $n$ $n'$, forming a double bottom to the grain-box, and adapting the slide to receive and discharge the corn. The shaft $k$ near its lower end is provided upon its opposite sides or faces with sloping shoulders or inclines $k'$, down which the corn descends to the rear, escaping through a slot or opening, at $p$, in a partial sleeve, P, covering the lower end of the shaft $k$, as shown. By this arrangement, and the location of the discharge-openings in the hopper-bottom, the discharges of corn pass down alternately on opposite sides of the shaft $k$, and are held between the inclines $p$ and sleeve P, near the bottom of the furrow, until, by the reverse vibration of the inclines $k'$ after receiving their respective charges, they are brought opposite the outlet $p$, when the several grains roll in quick succession into the furrow, the tapering form of the slot $p$, and the relation of the inclines $k$ thereto, facilitating the proper scattering of the grain. The perforations in the bottom plate $n'$ of the grain-box F, and those in the vibrating plates or slides N, are so arranged that the latter receives a charge at each end of its throw, and discharges the same on the reverse throw. These slides N are operated by the reciprocating bar O, which, midway of its length, is connected with a vibrating arm or lever, $o^1$, attached to a rocking plate, $o^2$, pivoted to the bar A′, and operated by connecting-links from the forked levers L L′, which vibrate in reverse directions, operated upon alternately by the knots or projections on the check-row cord M. By this arrangement, each knot in the cord is made to actuate both of the levers L L′ alternately, and thus, through the arrangement described, to vibrate the plates N N with a positive movement in both directions, causing a discharge of grain, at each throw, into the seed-channel $g$, and thence through the vibration of the rock-shaft $k$ into the furrow, as described.

Q represents one of the guiding-pulleys for the check-row cord, pivoted between two plates, $q$ $q$, and provided with shanks or semi-sleeves $q'$, which clasp, and are free to turn upon, a horizontal pivot, $r$, on a vertically-pivoted pulley-holder, R, mounted on the end of a transverse bar, A′. A lower horizontal arm of the pulley-holder, resting on the bar A′, is forked or provided with spurs $r^1$ $r^2$, which, striking against a pin, $s$, prevent the horizontal vibration of the pulley-holder beyond the two positions shown in Fig. 2, and the sleeve $q'$ has a flange formed upon one side, which rests upon a pin or stop, $s$, adapting said sleeve with its plates $q$ $q$ and pulley Q to be turned over from one side to the other, but preventing it from dropping below a horizontal position. By this arrangement the necessity of removing the cord from the pulley when the machine is turned at the end of the field is obviated, it being necessary only to turn the pulley over, and to allow the pulley-holder to vibrate on its vertical pivot.

Having now described my improvements, what I claim as new, and desire to secure by Letters Patent, in this division, is—

1. The rocking bar D, pivoted to the horizontal bars A A, and the arms or links $d$ $d$, also pivoted to said bars, in combination with the vibrating seeding attachment, for maintaining the horizontal position of the latter, as described.

2. The vibrating seat-standard H, lever D, and connecting bar or link $i$, in combination with the seeding attachment, substantially as described.

3. The shaft $k$, provided with the inclines $k'$, arranged within the seeding tube or channel $g$, and operating relatively to the discharge-outlet $p$, substantially as described.

4. The combination of the shaft $k$ and slide N, or equivalent devices, for producing the upper and lower drop of the grain, as described, with the actuating check-row cord through the connecting devices, substantially as described, whereby a positive movement in both directions is given to said dropping devices, substantially as and for the purpose set forth.

5. The semi-revolving pulley-holder, substantially as described, and for the purpose set forth.

GEORGE D. HAWORTH.

Witnesses:
W. W. KERR,
BYRON PHELPS.